US 012387517B1

United States Patent
Kittenplon et al.

(10) Patent No.: US 12,387,517 B1
(45) Date of Patent: Aug. 12, 2025

(54) GRAPH-BASED DOCUMENT LAYOUT DETECTION

(71) Applicant: Amazon Technologies, Inc., Seattle, WA (US)

(72) Inventors: Yair Kittenplon, Raanana (IL); Shai Mazor, Binyamina (IL); Ron Litman, Tel-Aviv (IL); Niv Berchi Nayman, Shoham (IL); Shahar Tsiper, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 18/065,541

(22) Filed: Dec. 13, 2022

(51) Int. Cl.
*G06V 30/414* (2022.01)
*G06V 10/82* (2022.01)
*G06V 30/10* (2022.01)
*G06V 30/413* (2022.01)
*G06V 30/416* (2022.01)

(52) U.S. Cl.
CPC ............ *G06V 30/414* (2022.01); *G06V 10/82* (2022.01); *G06V 30/10* (2022.01); *G06V 30/413* (2022.01); *G06V 30/416* (2022.01)

(58) Field of Classification Search
CPC ........ G06V 10/82; G06V 30/10; G06V 30/41; G06V 30/412; G06V 30/413; G06V 30/414; G06V 30/416; G06F 16/93; G06F 16/9024
See application file for complete search history.

(56) References Cited

U.S. PATENT DOCUMENTS

| | | | | |
|---|---|---|---|---|
| 8,565,474 | B2 | 10/2013 | Radakovic | |
| 10,049,270 | B1* | 8/2018 | Agarwalla | G06V 30/414 |
| 11,087,086 | B2* | 8/2021 | An | G06F 18/24 |
| 11,113,518 | B2* | 9/2021 | Chua | G06F 18/2413 |
| 2013/0194448 | A1 | 8/2013 | Baheti | |
| 2023/0146501 | A1* | 5/2023 | Agarwal | G06N 3/09 382/190 |
| 2023/0260310 | A1* | 8/2023 | Rangarajan | G06V 30/414 382/176 |
| 2023/0394859 | A1* | 12/2023 | Montero | G06V 30/146 |

OTHER PUBLICATIONS

Renshen Wang et al., "Post-OCR Paragraph Recognition by Graph Convolution Networks", dated Nov. 15, 2022, pp. 1-11.

* cited by examiner

*Primary Examiner* — Daniel G Mariam
(74) *Attorney, Agent, or Firm* — S. Scott Foster; Kowert, Hood, Munyon, Rankin & Goetzel, P.C.

(57) ABSTRACT

A document layout system for determining a layout of a document. The document layout system is configured to apply an OCR technique to identify the text in the document. The document layout system is further configured to generate a graph representation of the document, wherein the graph representation comprises a plurality of nodes and a plurality of edges that connect different ones of the plurality of nodes, wherein individual ones of the nodes correspond to different portions of the text. The document layout system is also configured to apply a graph cluster network machine learning model to the graph representation to identify a layout of different sections of the document according to respective merge inferences determined for individual ones of the plurality of edges. The document layout system is also configured to provide the layout of different sections of the document.

20 Claims, 8 Drawing Sheets

GRAPH-BASED DOCUMENT LAYOUT DETECTION

BACKGROUND

Documents may be stored in a digital format on computing systems. The documents may also be converted from a physical document to a digital document based on optically capturing the physical document, such as by scanning the physical document. Scanning software may also include optical character recognition (OCR) functionality that allows the digital document to be processed or interpreted as a text-based document by the computing systems.

Text-based documents do not conventionally include layout information that identify a natural reading order that is perceptible by a human reader. OCR algorithms may be unable to discern that a document that has a two-column layout should be read based on the columns rather than as lines going across the entire page. Additionally, the OCR algorithms may be unable to determine that the document is for a particular type of document based on its layout.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various systems and methods for detecting layouts for documents based on graph representations of the documents are described herein. The documents may be digitized from physical documents, such as documents that have been scanned by a scanner device. The documents may also be digitally generated according to document or word processing software. In some situations, the documents may be processed according to an optical character recognition (OCR) system or process. The documents may include data or metadata indicating at least words and lines that have been detected in the documents according to the OCR.

The documents may have indications of where the words and lines are located within the document. The words and lines may be defined by positional information that indicate respective locations in the respective documents. For example, the positional information may include (X, Y) coordinates that indicate relative positions within a document. As another example, the positional information may also include height and width values that indicate a size of a bounding box for the words and lines.

The document layout system may receive the document that has been processed with OCR. In some implementations, a machine learning model may be implemented and applied to the document to generate a graph representation of the document. The graph representation may include a plurality of nodes and one or more edges, where individual edges are connected to at least two of the nodes. The nodes may represent text sections comprising one or more words or lines that collectively form a text section of the document. The graph representation may be visualized as a line graph that traces through the text sections of the document to represent a reading order or a layout of the document.

Another machine learning model may be applied to determine whether particular groupings of words or lines collectively form a text section. For example, a particular group of lines may be interpreted to be a sentence or paragraph based on their collective arrangement on the document. The sentence or paragraph may be designated as a text section for the purpose of organization and layout in the document. The machine learning model may also be configured to generate a graph representation of the document. In some implementations, the graph representation may have one or more nodes and one or more edges connected to respective ones of the one or more nodes. The nodes may comprise properties of the text from the document.

The machine learning model may classify text sections based on characteristics of the features of the nodes. For example, classifications of the text sections may include title, paragraph, body text, etc. The machine learning model may also determine a reading order and a layout of the document based on the classified text sections and the graph representation of the document.

In one aspect, a system is described. The system may include one or more processors and a memory storing instructions that, when executed on or across the one or more processors, cause the one or more processors to perform operations for a document layout system. The document layout system is configured to receive a document comprising text. The document layout system is also configured to apply an optical character recognition (OCR) technique to identify the text in the document. The document layout system is further configured to generate a graph representation of the document, wherein the graph representation comprises a plurality of nodes and a plurality of edges that connect different ones of the plurality of nodes, wherein individual ones of the nodes correspond to different portions of the text identified according to the OCR technique. The document layout system is also configured to apply a graph convolutional network (GCN) machine learning model to the graph representation to identify a layout of different sections of the document according to respective merge inferences determined for individual ones of the plurality of edges. The document layout system is also configured to provide the layout of different sections of the document.

In another aspect, a method is described. The method may include performing, with one or more computing devices: receiving a document comprising text. The method may also include generating a graph representation of the document, wherein the graph representation comprises a plurality of nodes and a plurality of edges that connect different ones of the plurality of nodes, wherein individual ones of the nodes correspond to different portions of the text identified according to a text detection technique. The method may further include applying a graph convolutional network (GCN) machine learning model to the graph representation to identify a hierarchy of different sections of the document according to respective merge inferences determined for individual ones of the plurality of edges. The method may also include providing the hierarchy of different sections of the document.

In yet another aspect, one or more computer-readable storage media storing instructions that, when executed on or across one or more processors, cause the one or more processors to perform operations is described. The operations may include in response to receiving a document comprising text, generating a graph representation of the document, wherein the graph representation comprises a plurality of nodes and a plurality of edges that connect different ones of the plurality of nodes, wherein individual ones of the nodes correspond to different portions of the text identified according to a text detection technique. The operations may also include applying a graph convolutional network (GCN) machine learning model to the graph representation to identify a hierarchy of different sections of the document according to respective merge inferences determined for individual ones of the plurality of edges. The operations may further include providing the hierarchy of different sections of the document.

Figure 1:
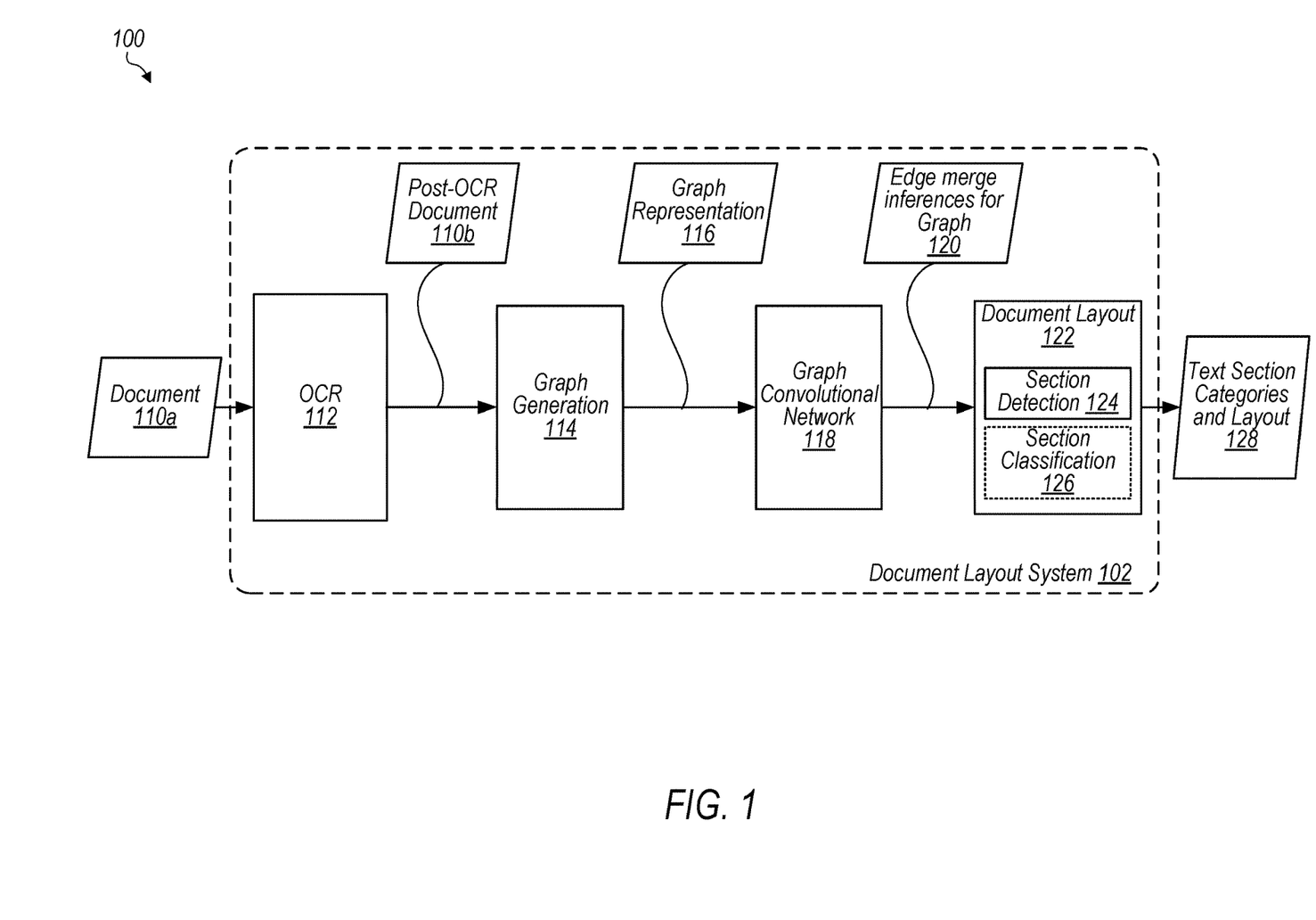
FIG. 1 is a block diagram of system configured to determine text section categories and layouts of documents, according to some embodiments.

FIG. 1 is a block diagram of system 100 configured to determine text section categories and layouts of documents, according to some embodiments. Various aspects of system 100 may be implemented by one or more computing devices that include one or more processors and memories that store program instructions that cause the one or more processors to perform computing operations. System 100 may include document layout system 102. In some implementations, document layout system 102 may be implemented by one or more computing devices hosted by a service provider. The service provider may include a provider network that is configured to provide access to various network-based services to various clients via a network, such as the Internet.

System 100 may be configured to receive documents from clients or data stores to be processed by document layout system 102, according to some embodiments. As an illustrative example, document 110a may be provided to system 100 via one or more interfaces between clients and system 100. For example, the interfaces may include application programmatic interfaces (APIs) that are exposed or made available for access to system 100. Document 110a may be a digitized document based on capturing a physical document. In many situations, document 110a may be an optically captured image of the physical document. For example, document 110a may be a scanned copy of a printed document. Thus, document 110a may initially lack plain text data based on being a scanned copy.

Document layout system 102 may also include optical character recognition (OCR) 112 configured to detect and process text that may be found in documents, such as document 110a, according to some embodiments. OCR 112 may include one or more processes or algorithms configured to detect text elements included in document 110a. For example, OCR 112 may include an OCR process configured to detect the text elements in document 110a. In some implementations, OCR 112 may cause the detected text elements of document 110a to be handled as plain text by one or more other software functions, such as text selection, copying, editing, or any other similar type of text-based functionality. OCR 112 may generate document 110b according to the OCR process, where document 110b has text elements that were determined by the OCR process. In some implementations, document 110b may be stored in place of document 110a in a data store. For example, document 110a may be overwritten by document 110b. In some implementations, document layout system 102 may include an object detection model configured to detect text sections based on analyzing the text in the document. The object detection model may detect the objects separately from graph representations of the documents. OCR 112 and the object detection model may be combined to improve text detection by having multiple detection models applied to the same document.

OCR 112 may identify various text components of document 110b, according to some embodiments. For example, OCR 112 may identify individual words and individual lines of document 110b. In some embodiments, the text components may be indicated by metadata. For example, indications of the text components may be appended to the metadata of document 110b. The indications may include representations of bounding boxes that encapsulate the individual words and the individual lines. For example, a bounding box may be defined by (X,Y) coordinates that indicate relative positions in document 110b. As another example, the bounding box may also be defined by width and height dimensions that extend from the (X,Y) coordinates. In some implementations, the bounding box may be defined by a combination of (X, Y, W, H) coordinates that describe the (X,Y) location and the width and height of the resulting bounding box.

Document 110b may be provided to document layout system 102 for determination of any text sections and layouts contained therein, according to some embodiments. Document layout system 102 may include one or more machine learning models configured to perform machine learning-based functions on input documents, such as document 110b. In some embodiments, document layout system 102 may include graph generation 114, graph convolutional network (GCN) 116, and document layout 122.

Graph generation 114 may be configured to generate graph representations of documents. For example, graph generation 114 may be configured to generate graph representation 116 based on document 110b. Graph generation 114 may include one or more neural networks configured to determine relationships between text elements found in documents. For example, a neural network may be configured to determine connectivity between different text elements. In some implementations, graph generation 114 may establish the text elements, such as words or lines, as nodes in graph representation 116. Graph generation 114 may determine connections between various text elements and record the connections as graph edges in graph representation 116. In some embodiments, the connections may be determined based on relative distances between bounding boxes of the text elements. For example, the Euclidian distance between center points of two bounding boxes may serve as a basis for determining the connections. As another example, a shortest distance between two bounding boxes, such as between outer edges of the bounding boxes, may serve as a basis for determining the connections.

Based on the determined connections, graph generation 114 may generate graph representation 116 of document 110b. In some implementations, graph representation 116 may be characterized as a line graph where nodes are interconnected with graph edges, where nodes are points in Euclidean space, and graph edges are lines connecting the points. Different connectivity policies may be implemented to determine the connections. The connectivity policy may be selected by the client or document layout system 102 from a list of connectivity policy options. For example, the connectivity policies may include an all-to-all algorithm, where each of the nodes is connected to the other nodes. As another example, the connectivity policies may include a K-nearest neighbors algorithm, where a node is connected to an integer k quantity of nearest other nodes. As yet another example, the connectivity policies may include a beta skeleton algorithm, where a node is connected to another node based on relative angles between the node and multiple other nodes based on a numerical parameter f.

Graph generation 114 may determine text sections of documents based on a hierarchy of words, lines and sections, according to some embodiments. The text sections may be determined based on groupings of words or lines. For example, a text section may be determined based on a subset of lines in the document being grouped together. The text sections may include paragraphs that have multiple lines of text. A reader may construe a contiguous text section as a paragraph. In some implementations, graph generation 114 may include a clustering function to determine clusters of text that may be respective text sections, such as paragraphs or text blocks. For example, the clustering function may determine that a plurality of words or lines collectively form a contiguous text section.

Nodes of graph representation 116 may include multiple features that define at least one aspect of the respective text element represented by the respective node, according to some embodiments. For example, the features of a node may include a visual feature, a geometric feature, and a textual feature. The visual feature may include an image copy of the text element as it appears in document 110b. The image copy may be obtained from the document 110b. In some implementations, the image copy may be generated based on selectively cropping an image of document 110b based on the bounding box of the text element. The cropped image may also be an input to a residual neural network to further implement deep learning of image data. The geometric feature may include geometric definitions of the bounding box of the text element. For example, the geometric definitions may include (X, Y, W, H) coordinates for (X,Y) positioning with a width and height of the bounding box. The textual feature may include the text element transcribed in plain text according to an OCR process, such as by OCR 112. As another example, the textual feature may include text tokens for the portion of the text generated by OCR 112.

Document layout system 102 may also include GCN 118, according to some embodiments. GCN 118 may be configured to apply one or more machine learning models to graph representation 116 to generate edge merge inferences 120 based on the edges in graph representation 116. For example, GCN 118 may generate edge merge inferences 120 based on characteristics of the edges in graph representation 116. In some implementations, the characteristics may include relative lengths of the graphs or relative positions of the nodes.

Document layout 122 may be configured to detect text sections of document 110b according to edge merge inferences 120 generated based on graph representation 116, according to some embodiments. Document layout 122 may be configured to identify and classify types of text sections in documents, according to some embodiments. Document layout 122 may include section classification 126 configured to identify text sections contained in documents based on edge merge inferences 120 for graph representation 116. For example, section classification 126 may identify that a particular text section is the title of document 110b. As another example, section classification 126 may identify that a particular text section is a paragraph of document 110b. The determined type may be included as part of metadata of document 110b and associated with the respective text sections.

The determined classifications may be further processed to determine a layout of document 110b, according to some embodiments. For example, document layout 122 configured to predict or determine the layout of documents based on various criteria including the detected text sections or classifications. Document layout 122 may be configured to analyze the determined classifications of the text elements in view of graph representation 116. For example, document layout 122 may compare the classifications against other documents and respective locations of text elements and their respective classifications. In some implementations, document layout 122 may include weights based on different types of text element classifications such that different types of classifications may increase or decrease the likelihood that a given document has a particular layout and type.

Document layout system 102 may output information indicating text section categories and layout 122 of document 110a. The information indicating text section categories and layout 122 may be provided to a data storage destination or provided in response to a client request, according to various embodiments.

Figure 2:
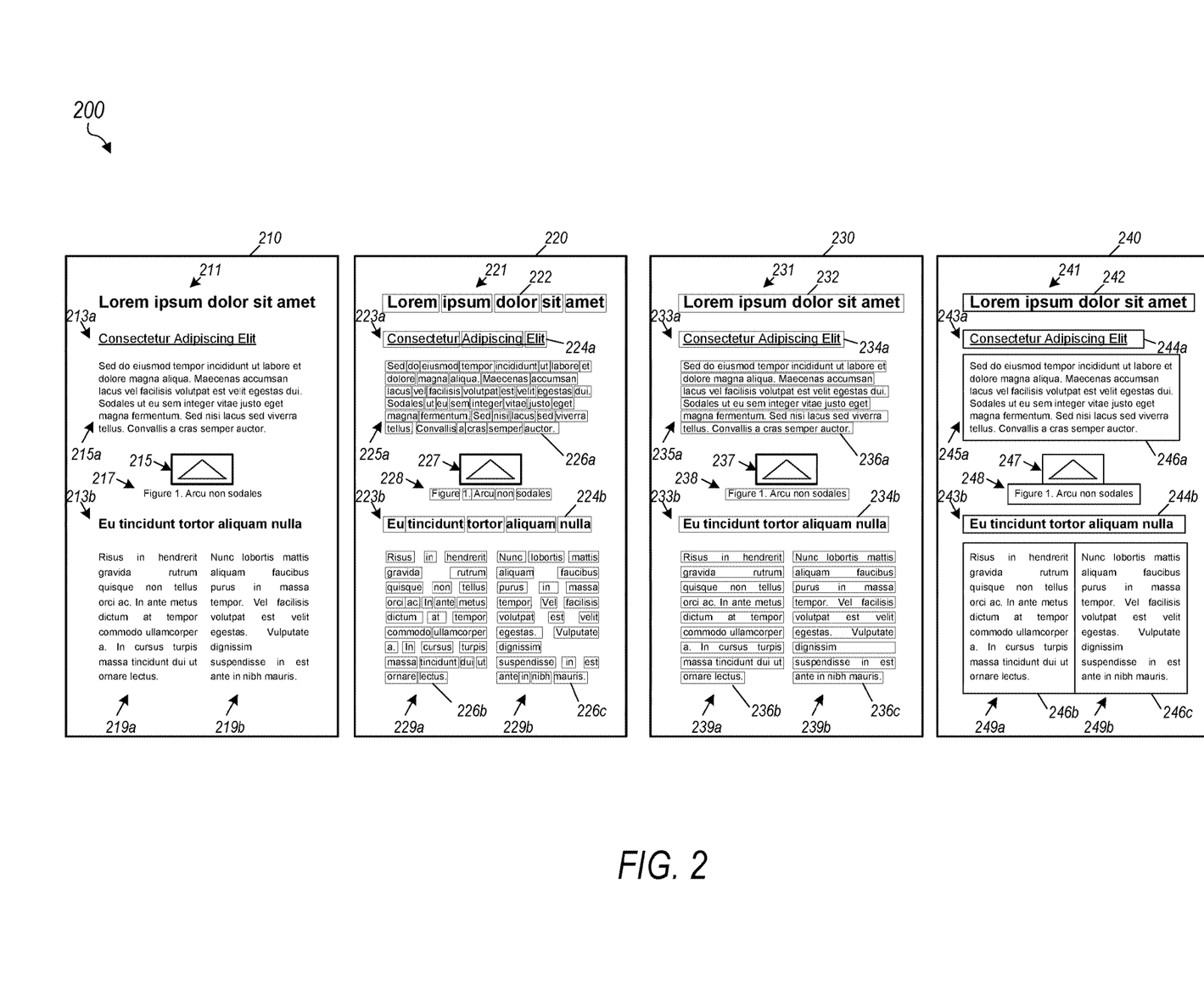
FIG. 2 illustrates representations of a document being processed by a document layout system, according to some embodiments.

FIG. 2 illustrates representations 200 of a document being processed by a document layout system, according to some embodiments. The document layout system may correspond to document layout system 102 of FIG. 1. The document may be provided by a client to the document layout system via an API exposed to the client from a service provider.

Document 210 is an illustrative example of a document that may be provided by the client to the document layout system for processing, according to some embodiments. The particular layout and text on document 210 are for illustrative purposes and are not intended to be limiting on the types of documents that may be provided to or processed by the document layout system. Document 210 may include title 211, heading 213a, body text 215a, and heading 213b. Document 210 may also include image 217 that has caption text 218. Document 210 may also include subheading 213b and text columns 219a and 219b.

An OCR process may receive document 210 for processing. The OCR process may correspond to OCR 112 of FIG. 1, according to some embodiments. The OCR process may generate document 220 based on document 210. The OCR process may include identifying text elements contained in document 110. The OCR process may further identify individual words included in document 210. As an illustrative example, the OCR process may be configured to highlight or indicate words contained in document 210 with a bounding box.

Document 220 may include title 221, heading 223a, body text 225a, and heading 213b. Document 220 may also include image 227 that has caption text 228. Document 220 may also include subheading 223b and text columns 229a and 229b. An OCR process may generate bounding boxes around individual words of document 222. The OCR process may generate bounding boxes 222 for the words of title 221. The OCR process may generate bounding boxes 224a for the words of heading 223a. The OCR process may also generate bounding boxes 226a for body text 225a. Image 227 does not contain any text and therefore is not represented by a bounding box. The OCR process may generate bounding boxes 224b for heading 223b. The OCR process may also generate bounding boxes 226b and 226c respectively for text columns 229a and 229b.

Document 230 may include title 231, heading 233a, body text 235a, and heading 213b. Document 230 may also include image 237 that has caption text 238. Document 230 may also include subheading 233b and text columns 239a and 239b. An OCR process may generate bounding boxes around individual lines of document 232. The OCR process may generate bounding boxes 232 for the line of title 231. The OCR process may generate bounding boxes 234a for the line of heading 233a. The OCR process may also generate bounding boxes 236a for body text 235a. Image 237 does not contain any text and therefore is not represented by a bounding box. The OCR process may generate bounding boxes 234b for heading 233b. The OCR process may also generate bounding boxes 236b and 236c respectively for text columns 239a and 239b.

Document 240 may include title 241, heading 243a, body text 245a, and heading 213b. Document 240 may also include image 247 that has caption text 248. Document 240 may also include subheading 243b and text columns 249a and 249b. A document layout process may generate bounding boxes around text sections of document 242. The document layout process may generate bounding boxes 242 for the text section of title 241. The document layout process may generate bounding boxes 244a for the text section of heading 243a. The document layout process may also generate bounding boxes 246a for body text 245a. Image 247 does not contain any text and therefore is not represented by a bounding box. The document layout process may generate bounding boxes 244b for heading 243b. The document layout process may also generate bounding boxes 246b and 246c respectively for text columns 249a and 249b.

Figure 3:
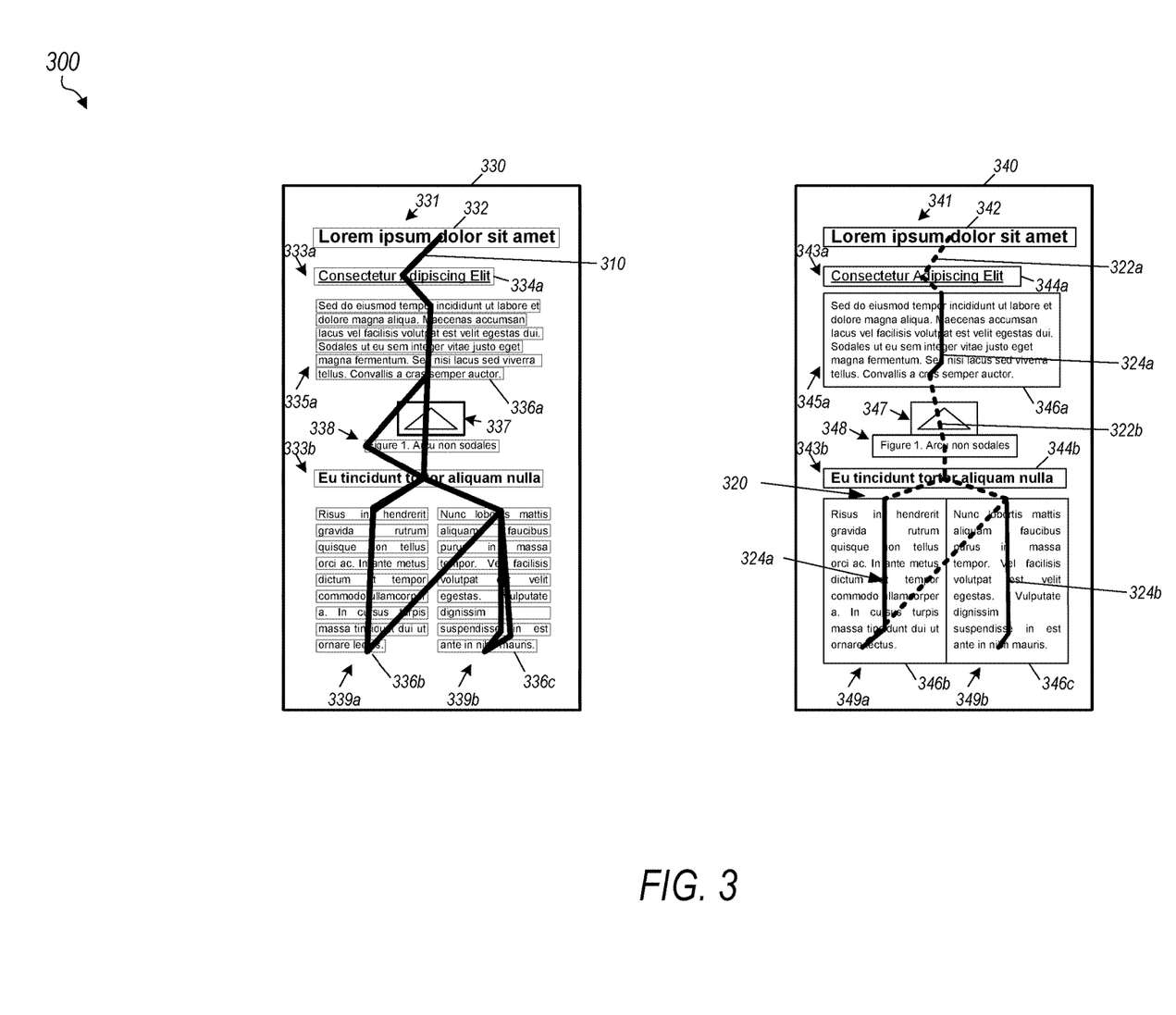
FIG. 3 illustrates graph representations of documents processed by one or more aspects of a document layout system, according to some embodiments.

FIG. 3 illustrates graph representations 300 of documents processed by one or more aspects of a document layout system, according to some embodiments. The document layout system may correspond to document layout system 102 of FIG. 1, according to some embodiments.

Document 330 may include title 331, heading 333a, body text 335a, and heading 313b. Document 330 may also include image 337 that has caption text 338. Document 330 may also include subheading 333b and text columns 339a and 339b. An OCR process may generate bounding boxes around individual lines of document 332. The OCR process may generate bounding boxes 332 for the line of title 331. The OCR process may generate bounding boxes 334a for the line of heading 333a. The OCR process may also generate bounding boxes 336a for body text 335a. Image 337 does not contain any text and therefore is not represented by a bounding box. The OCR process may generate bounding boxes 334b for heading 333b. The OCR process may also generate bounding boxes 336b and 336c respectively for text columns 339a and 339b.

A graph generator, such as graph generation 114, may be configured to generate a graph representation of document 330, such as graph representation 310. In different implementations, the graph generator may generate the graph representation based on documents that have bounding boxes for words, such as document 220. As an illustrative example, graph representation 310 comprises nodes and edges, where the nodes represent text elements in document 330, and the edges represent connections or relationships between the text elements. For example, a given node of graph representation 310 may correspond a particular text element, such as bounding box 332 for title 331. In some implementations, the nodes may include metadata indicating multiple features that define at least one aspect of the respective text element represented by the respective node, according to some embodiments. For example, the features of a node may include a visual feature, a geometric feature, and a textual feature. The visual feature may include an image copy of the text element as it appears in document 330. In some implementations, the image copy may be generated based on selectively cropping an image of document 330. The cropped image may also be an input to a residual neural network to further implement deep learning of image data. The geometric feature may include geometric definitions of the bounding box of the text element. For example, the geometric definitions may include (X, Y, W, H) coordinates for (X,Y) positioning with a width and height of the bounding box. The textual feature may include the text element transcribed in plain text according to the OCR process.

As an illustrative example, the node for bounding box 334b have multiple edges directed to bounding boxes 336b of column 339a and bounding boxes 336c of column 339b. In some situations, the graph generator may attempt to infer a reading order between different text elements. A human reader would be able to determine which of text columns 339a or 339b are supposed to be read after heading 333b. However, the graph generator may make inferences based on analysis of previous documents. The directionality and shape of graph representation 310 may indicate inferences for the reading order of document 330.

Document 340 may include title 341, heading 343a, body text 345a, and heading 313b. Document 340 may also include image 347 that has caption text 348. Document 340 may also include subheading 343b and text columns 349a and 349b. A document layout process may generate bounding boxes around text sections of document 342. The document layout process may generate bounding boxes 342 for the text section of title 341. The document layout process may generate bounding boxes 344a for the text section of heading 343*a*. The document layout process may also generate bounding boxes 346*a* for body text 345*a*. Image 347 does not contain any text and therefore is not represented by a bounding box. The document layout process may generate bounding boxes 344*b* for heading 343*b*. The document layout process may also generate bounding boxes 346*b* and 346*c* respectively for text columns 349*a* and 349*b*.

Graph generation 114 may generate a graph generation of document 340, such as graph representation 320. As an illustrative example, graph representation 320 comprises nodes and edges, where the nodes represent text elements in document 340, and the edges represent connections or relationships between the text elements. For example, a given node of graph representation 330 may correspond a particular text element, such as bounding box 342 for title 341. Edge 322*a* is depicted as a dashed line to indicate a connection between respective nodes corresponding to bounding boxes 342 and 344*a*. Line 324*a* is depicted as a solid line to indicate a reading order through body text 345*a* represented by bounding box 346*a*.

Edge 322*b* may pass through image 347 based on the OCR process bypassing non-text content found in document 340. Based on a determination that image 347 is to be bypassed, caption text 348 may also be excluded from graph representation 320. The node corresponding to heading 343*b* represented by bounding box 344*b* may have multiple edges based on subsequent bounding boxes 346*b* and 346*c*. As an illustrative example, the node for bounding box 344*b* have multiple edges directed to bounding boxes 346*b* of column 349*a* and bounding boxes 346*c* of column 349*b*. In some situations, the graph generator may attempt to infer a reading order between different text elements. A human reader would be able to determine which of text columns 349*a* or 349*b* are supposed to be read after heading 343*b*. However, the graph generator may make inferences based on analysis of previous documents. The directionality and shape of graph representation 320 may indicate inferences for the reading order of document 340, where dashed lines indicate edge connections between nodes having reading orders indicated by solid lines.

Figure 4:
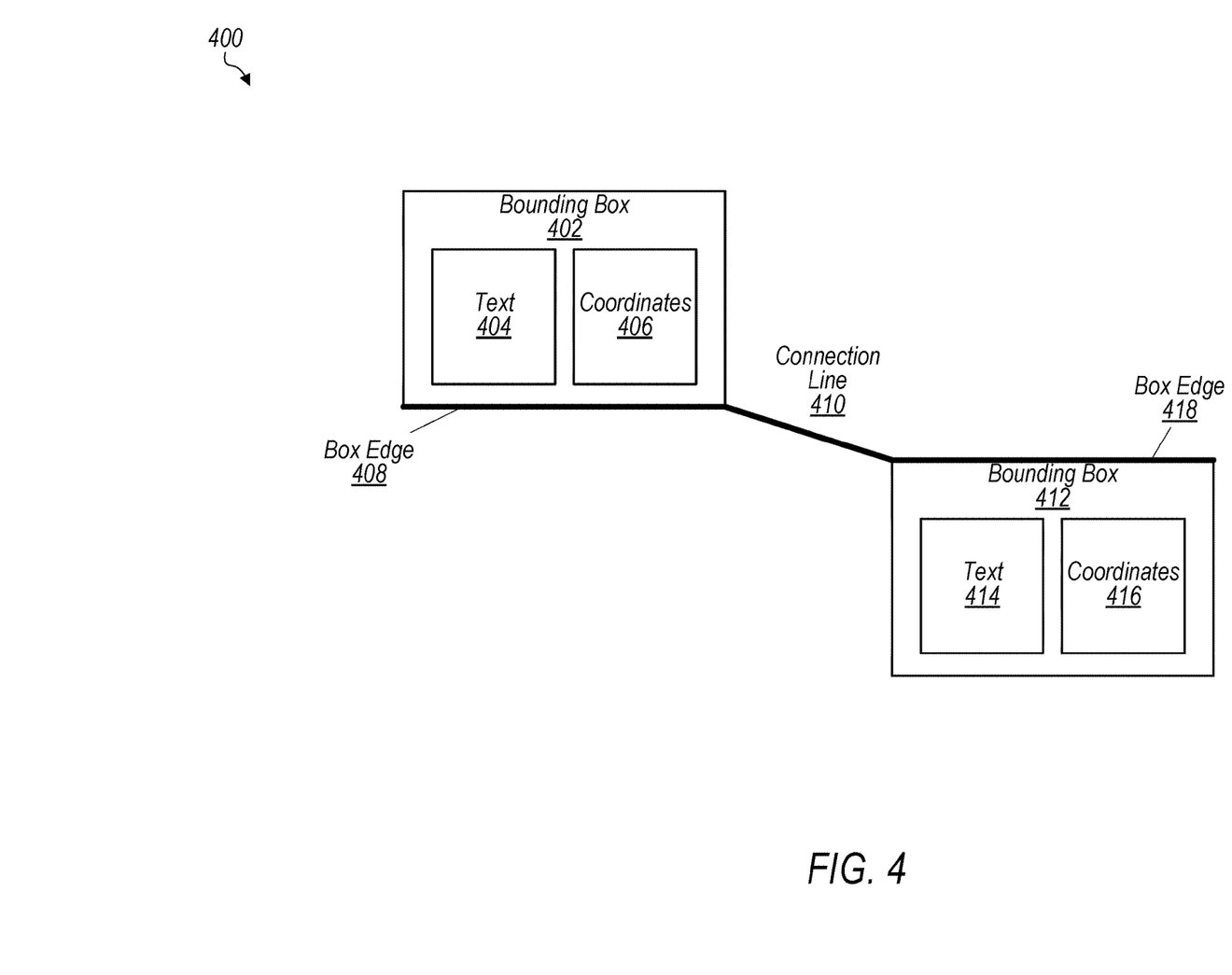
FIG. 4 illustrates a block diagram of bounding boxes and that represent text elements in a document that is processed by a document layout system, according to some embodiments.

FIG. 4 illustrates a block diagram 400 of bounding boxes 402 and 412 that represent text elements in a document that is processed by a document layout system, according to some embodiments.

Bounding box 402 may be configured to encapsulate or identify text 404 in the document. Text 404 may include an image representation of text 404 as captured from the document. Text 404 may include a plain text representation of text 404 as determined by an OCR process. Bounding box 402 may be defined by coordinates 406. For example, coordinates 406 may include (X, Y, W, H) coordinates for (X,Y) positioning with a width and height of bounding box 402.

Bounding box 412 may be configured to encapsulate or identify text 414 in the document. Text 414 may include an image representation of text 414 as captured from the document. Text 414 may include a plain text representation of text 414 as determined by an OCR process. Bounding box 412 may be defined by coordinates 416. For example, coordinates 416 may include (X, Y, W, H) coordinates for (X,Y) positioning with a width and height of bounding box 412.

Bounding boxes 402 and 412 may be associated with respective nodes in a graph representation, such as graph representation 116 of FIG. 1, graph representation 310 or graph representation 320 of FIG. 3, according to some embodiments. Connection line 410 may represent a connection between bounding boxes 402 and 412. In some implementations, connection line 410 may be determined based on a distance between respective center points of bounding boxes 402 and 412.

In other implementations, connection line 410 may be determined based on a closest distance between any portion of bounding boxes 402 and 412. Bounding boxes 402 and 412 may have box edges that define respective perimeters. As an illustrative example, box edge 408 may represent the closest box edge of bounding box 402 to bounding box 412, and box edge 418 may represent the closest box edge of bounding box 412 to bounding box 402.

Figure 5:
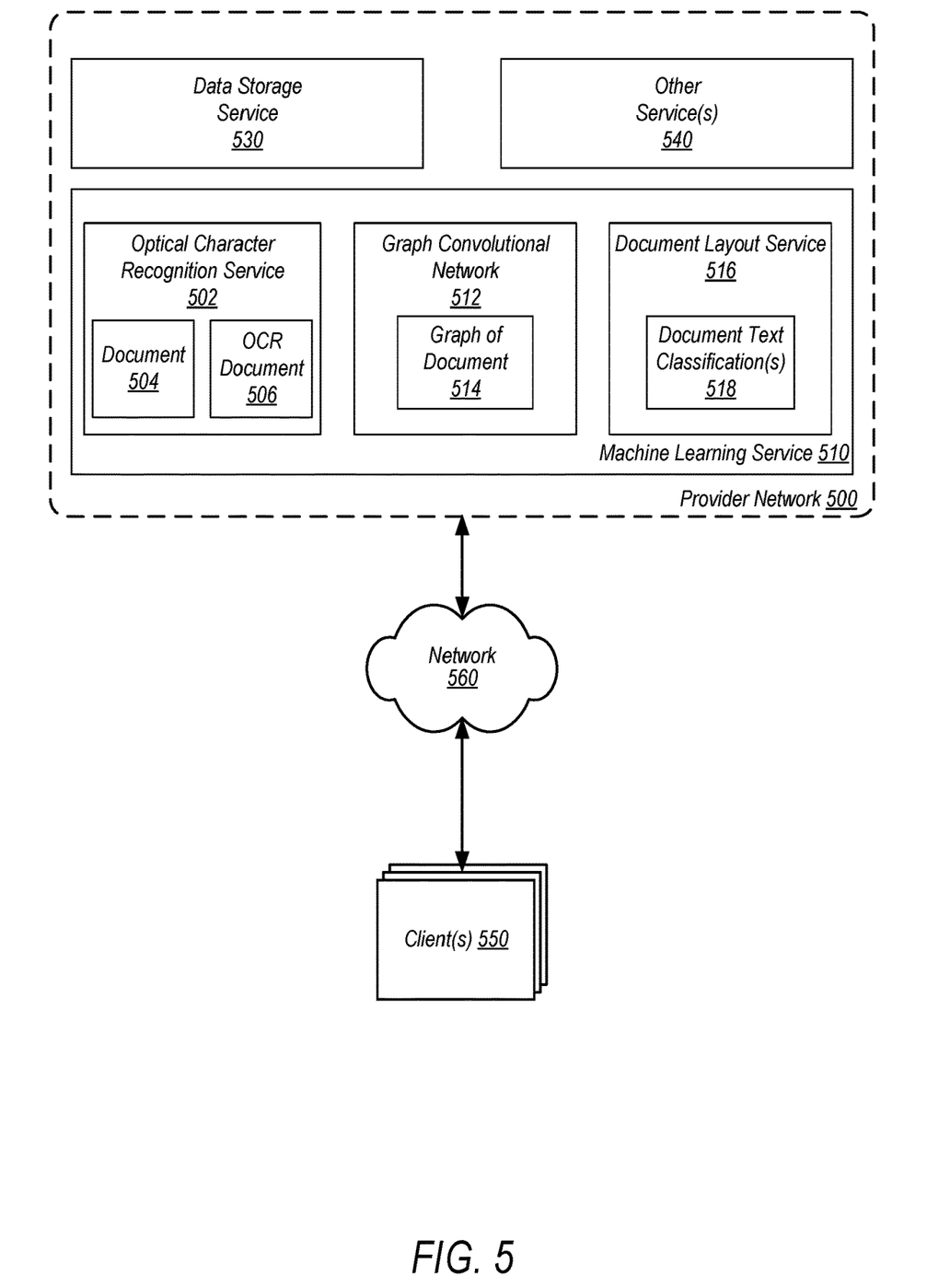
FIG. 5 is a logical block diagram illustrating a provider network that implements different services including a code development service, according to some embodiments.

FIG. 5 is a logical block diagram illustrating a provider network that implements different services including a code development service, according to some embodiments. A provider network 500 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 500 can provide convenient, on-demand network access to a shared pool of configurable computing resources that can be programmatically provisioned and released in response to customer commands. These resources can be dynamically provisioned and reconfigured to adjust to variable load.

The provider network 500 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 500 via a publicly accessible network (e.g., the Internet, a cellular communication network). Regions are connected to a global network which includes private networking infrastructure (e.g., fiber connections controlled by the cloud provider) connecting each region to at least one other region. The provider network 500 may deliver content from points of presence outside of, but networked with, these regions by way of edge locations and regional edge cache servers. This compartmentalization and geographic distribution of computing hardware enables the provider network 500 to provide low-latency resource access to customers on a global scale with a high degree of fault tolerance and stability.

As noted above, provider network 500 may implement various computing resources or services, such as machine learning service 510, data storage service 530 and other service(s) 540 which may be any other type of network-based services, including various other types of compute, data processing, machine learning, analysis, communication, event handling, visualization, and security services not illustrated).

In various embodiments, the components illustrated in FIG. 5 may be implemented directly within computer hardware, as instructions directly or indirectly executable by computer hardware (e.g., a microprocessor or computer system), or using a combination of these techniques. For example, the components of FIG. 5 may be implemented by a system that includes a number of computing nodes (or simply, nodes), each of which may be similar to the computer system embodiment illustrated in FIG. 8 and described below. In various embodiments, the functionality of a given system or service component (e.g., a component of machine learning service 510) may be implemented by a particular node or may be distributed across several nodes. In some embodiments, a given node may implement the functionality of more than one service system component (e.g., more than one data store component).

Machine learning service 510 may be implemented by provider network 500, according to some embodiments. machine learning service 510 may implement various features for generating, training and deploying machine learning models for different systems, applications, or devices. Machine learning service 510 may include optical character recognition service 502, graph convolutional network 512, and document layout service 516, according to some embodiments.

Optical character recognition service 502 may be configured to receive document 504 from clients 550. Optical character recognition service 502 may implement an OCR process to generate OCR document 506 based on document 504. OCR document 506 may identify text elements with bounding boxes determined according to the OCR process.

Optical character recognition service 502 may provide OCR document 506 to graph convolutional network 512. Graph convolutional network 512 may generate graph 514 of OCR document 506. Graph 514 may include nodes that represent text elements of OCR document 506 and edges that connect the text elements.

Document layout service 516 may be configured to determine document text classification(s) 518 based on graph 514 provided by graph convolutional network 514, according to some embodiments. For example, document layout service 516 may determine document text classification(s) 518 based on the nodes and edges indicated by graph 514 to determine that a particular text element has a particular text classification. Document text classification(s) 518 may be returned to client 550 or stored to data storage service 530 in addition to OCR document 506.

Generally speaking, clients 550 may encompass any type of client configurable to submit network-based requests to provider network 500 via network 560, including requests for services (e.g., a request for code search or suggestion, etc.). For example, a given client 550 may include a suitable version of a web browser, or may include a plug-in module or other type of code module that may execute as an extension to or within an execution environment provided by a web browser. Alternatively, a client 550 may encompass an application (or user interface thereof), a media application, an office application or any other application that may make use of resources in provider network 500 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 550 may be an application may interact directly with provider network 500. In some embodiments, client 550 may generate network-based services requests according to a Representational State Transfer (REST)-style network-based services architecture, a document- or message-based network-based services architecture, or another suitable network-based services architecture.

In some embodiments, a client 550 may provide access to provider network 500 to other applications in a manner that is transparent to those applications. For example, client 550 may integrate with machine learning service 510. However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 550 and the operating system or file system on behalf of applications executing within the operating system environment.

Clients 550 may convey network-based services requests to and receive responses from provider network 500 via network 560. In various embodiments, network 560 may encompass any suitable combination of networking hardware and protocols necessary to establish network-based-based communications between clients 550 and provider network 500. For example, network 560 may generally encompass the various telecommunications networks and service providers that collectively implement the Internet. Network 560 may also include private networks such as local area networks (LANs) or wide area networks (WANs) as well as public or private wireless networks. For example, both a given client 550 and provider network 500 may be respectively provisioned within enterprises having their own internal networks. In such an embodiment, network 560 may include the hardware (e.g., modems, routers, switches, load balancers, proxy servers, etc.) and software (e.g., protocol stacks, accounting software, firewall/security software, etc.) necessary to establish a networking link between given client 550 and the Internet as well as between the Internet and provider network 500. It is noted that in some embodiments, clients 550 may communicate with provider network 500 using a private network rather than the public Internet.

In some embodiments, provider network 500 may include the hardware (e.g., modems, routers, switches, load balancers, proxy servers, etc.) and software (e.g., protocol stacks, accounting software, firewall/security software, etc.) necessary to establish a networking links between different components of provider network 500, such as virtualization hosts, control plane components as well as external networks 560 (e.g., the Internet). In some embodiments, provider network 500 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 550 may be attached to the overlay network so that when a client 550 provides an IP address that they want to send packets to, the IP address is run in virtual space by communicating with a mapping service that knows where the IP overlay addresses are.

Figure 6:
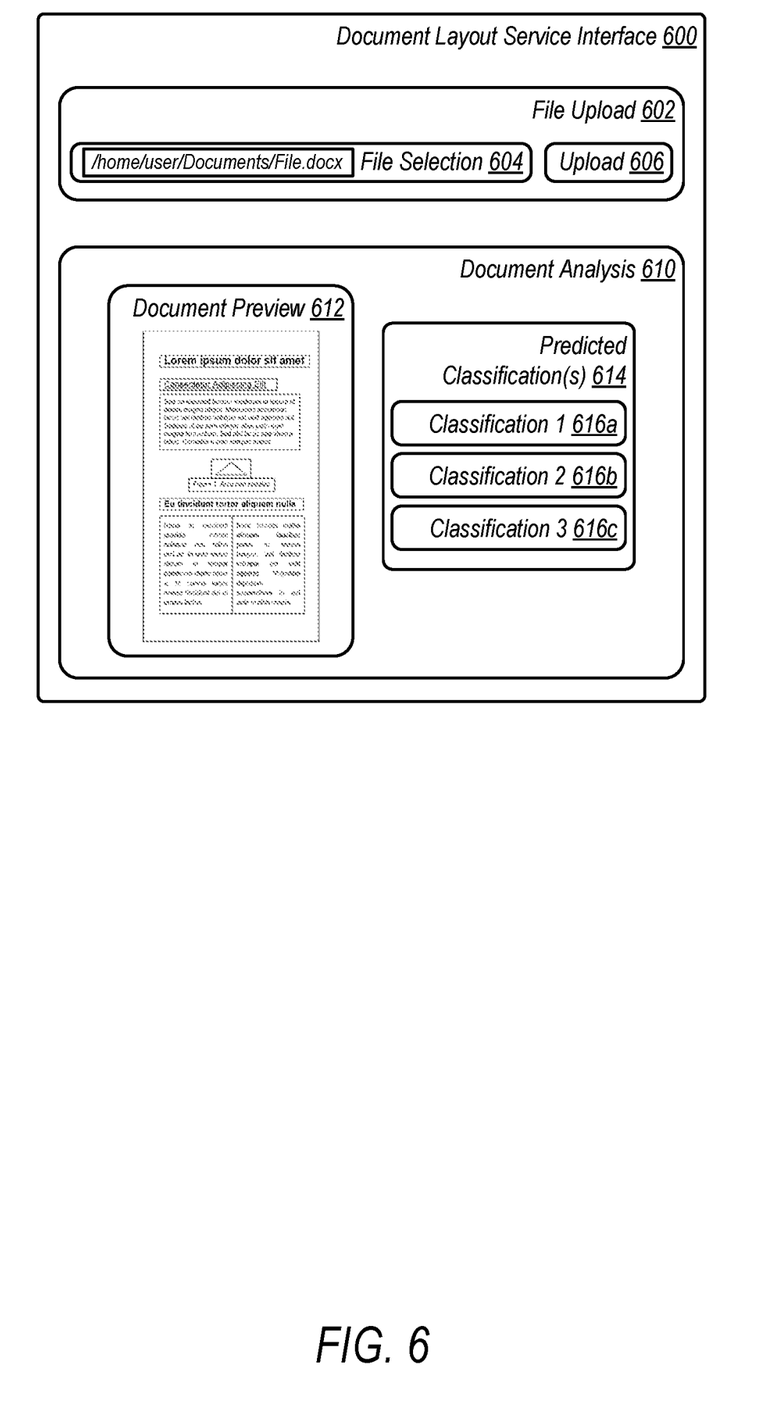
FIG. 6 illustrates an interface for a document layout service, according to some embodiments.

FIG. 6 illustrates an interface 600 for a document layout service, according to some embodiments. The document layout service may correspond to document layout system 102 of FIG. 1 or machine learning service 510 of FIG. 5, according to some embodiments. Interface 600 may be presented via one or more client-facing interfaces, such as a web interface or an API.

Interface 600 may include a file upload element 602, according to some embodiments. File upload element 602 may include a file selection element 604 configured to receive input from the client. The client may provide a document via the file selection element 604 to be uploaded to the document layout service for processing. The file upload element 602 may include an upload button 606. In response to a user interaction with the upload button 606, the interface 600 may obtain the document and provide the document to the document layout service.

After processing the document, the document layout service may provide document analysis 610 to the client via interface 600, according to some embodiments. Document analysis 610 may include a display element for document preview 612. In some implementations, document preview 612 may include a thumbnail representation of the document. The thumbnail representation may include bounding boxes around words, lines, or text sections based on a requested granularity. Document analysis 610 may indicate predicted classification(s) 614 for the document. Predicted classification(s) 614 may be based on a graph convolutional network and/or a document layout service configured to analyze the document. Predicted classification(s) 614 may include classifications 616a, 616b, 616c, and any other number of classifications. Predicted classification(s) 614 may also indicate a likelihood of each of classifications 616a, 616b, and 616c expressed as a percentage or ranking that a given classification is more likely to be correct.

Figure 7:
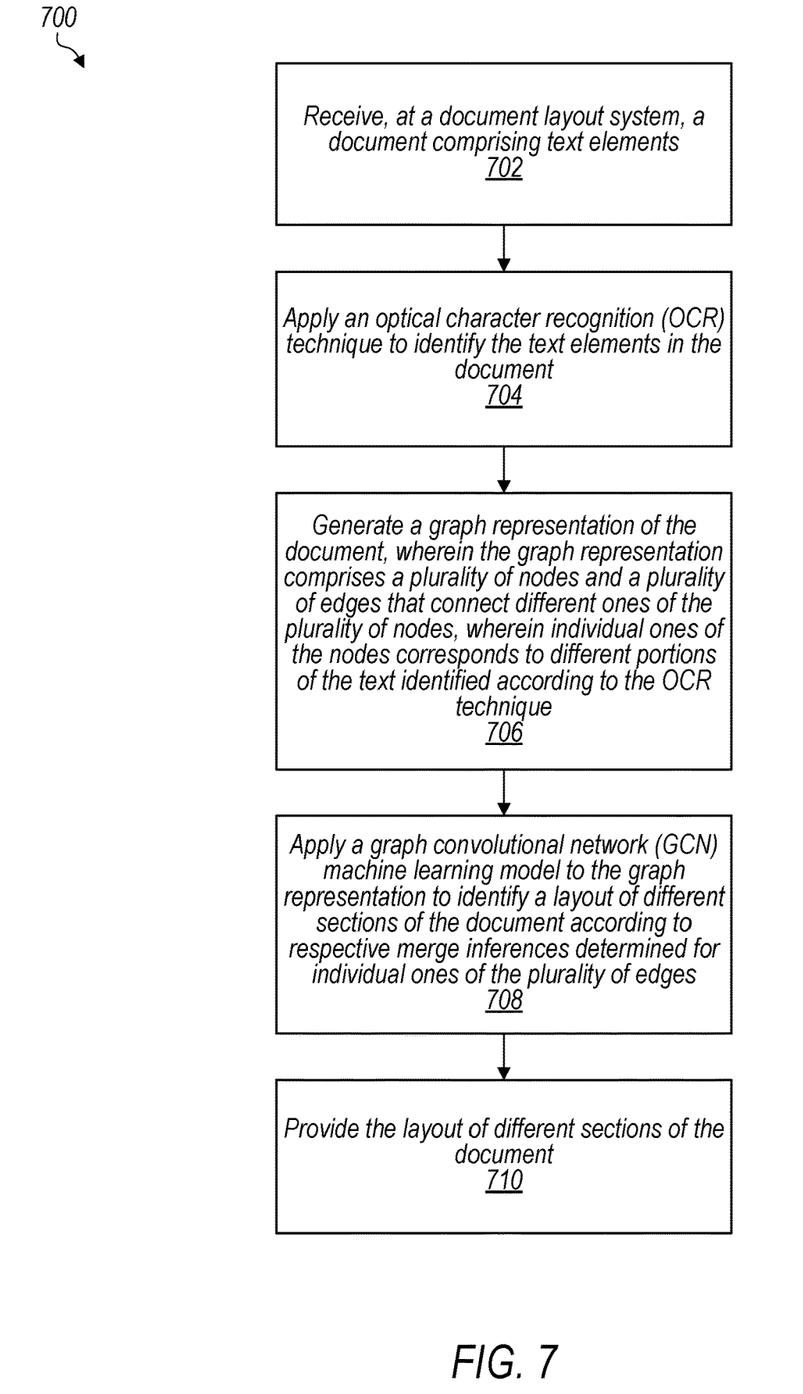
FIG. 7 is a block diagram of a method for determining a document layout based on text elements contained within the document, according to some embodiments.

FIG. 7 is a block diagram of a method 700 for determining a document layout based on text elements contained within the document, according to some embodiments. The method 700 may be implemented by one or more computing devices. The method 700 may be implemented by document layout system 102 of FIG. 1 or machine learning service 510 of FIG. 5, according to some embodiments.

The method 700 may include receiving, at a document layout system, a document comprising text, at 702. The method 700 may also include applying an optical character recognition (OCR) technique to identify the text elements in the document, at 704. The method may further include generating a graph representation of the document, wherein the graph representation comprises a plurality of nodes and a plurality of edges that connect different ones of the plurality of nodes, wherein individual ones of the nodes correspond to different portions of the text identified according to the OCR technique, at 706.

The method 700 may also include applying a graph cluster network (GCN) machine learning model to the graph representation to identify a layout of different sections of the document according to respective merge inferences determined for individual ones of the plurality of edges. The method 700 may further include providing the layout of different sections of the document, at 710.

Figure 8:
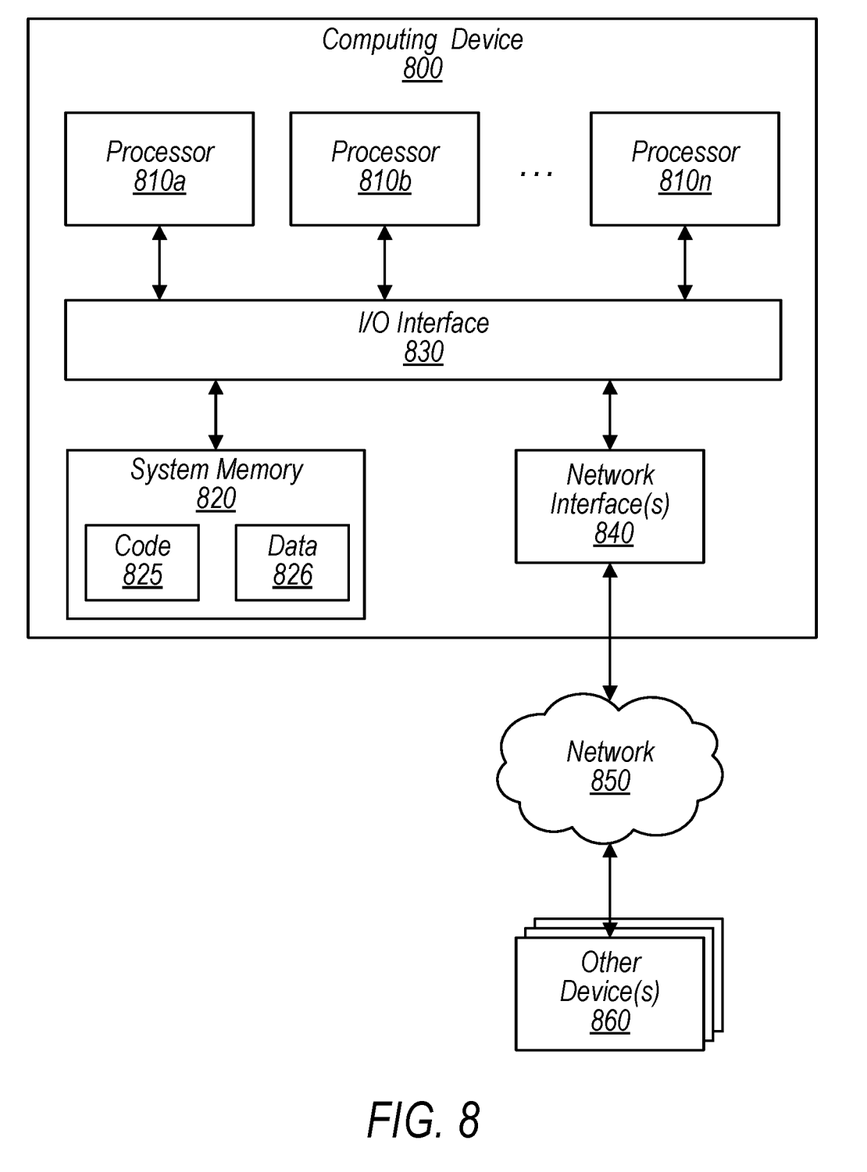
FIG. 8 is a block diagram showing an example computing device to implement the various techniques described herein, according to some embodiments.

FIG. 8 shows an example computing device to implement the various techniques described herein, according to some embodiments. For example, in one embodiment, the algorithm execution management system described above may be implemented by a computer device, for instance, a computer device as in FIG. 8 that includes one or more processors executing program instructions stored on a computer-readable storage medium coupled to the processors. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be one embodiment of a computer-accessible medium configured to store instructions and data accessible by processor(s) 810. In various embodiments, system memory 820 may be implemented using any non-transitory storage media or memory media, such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840. In the illustrated embodiment, program instructions (e.g., code) and data implementing one or more desired functions, such as the algorithm execution management system described above in FIGS. 1-6, are shown stored within system memory 830 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fiber Channel SANs, or via any other suitable type of network and/or protocol.

In some embodiments, system memory 820 may be one embodiment of a computer-accessible medium configured to store program instructions and data as described above for FIG. 1-8. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A system, comprising:
one or more processors; and
a memory storing instructions that, when executed on or across the one or more processors, cause the one or more processors to:
receive a document comprising text;
apply an optical character recognition (OCR) technique to identify the text in the document;
generate a graph representation of the document, wherein the graph representation comprises a plurality of nodes and a plurality of edges that connect different ones of the plurality of nodes, wherein individual ones of the nodes correspond to different portions of the text identified according to the OCR technique;
apply a graph convolutional network (GCN) machine learning model to the graph representation to identify a layout of different sections of the document according to respective merge inferences generated by the GCN for individual ones of the plurality of edges; and provide the layout of different sections of the document.

2. The system of claim 1, wherein, to apply the GCN machine learning model, the memory further comprises instructions that, when executed on or across the one or more processors, cause the one or more processors to:
identify individual ones of the different sections based on a determination that a respective subset of the plurality of nodes is to be grouped together.

3. The system of claim 2, wherein the memory further comprises instructions that, when executed on or across the one or more processors, cause the one or more processors to:
identify respective section classifications for the different sections of the document based on characteristics of the respective nodes for the different sections and the corresponding, respective edges connected to the respective nodes; and
determine the layout for the document based on the respective section classifications.

4. The system of claim 1, wherein individual ones of the plurality of nodes comprise:
respective image data obtained from the document for the portion of the text;
a respective bounding box for the portion of the text; and
a respective one or more text tokens for the portion of the text generated by the OCR technique.

5. The system of claim 1, wherein to generate the graph representation the memory further comprises instructions that, when executed on or across the one or more processors, cause the one or more processors to:
for individual nodes of the plurality of nodes:
determine respective edges to connect to one or more other nodes of the plurality of nodes according to a connectivity policy selected from a plurality of connectivity policy options.

6. A method, comprising:
performing, with one or more computing devices:
receiving a document comprising text;
generating a graph representation of the document, wherein the graph representation comprises a plurality of nodes and a plurality of edges that connect different ones of the plurality of nodes, wherein individual ones of the nodes correspond to different portions of the text identified according to a text detection technique;
applying a graph convolutional network (GCN) machine learning model to the graph representation to identify a hierarchy of different sections of the document according to respective merge inferences generated by the GCN for individual ones of the plurality of edges; and
providing the hierarchy of different sections of the document.

7. The method of claim 6, wherein applying the GCN machine learning model comprises:
identifying individual ones of the different sections based on a determination that a respective subset of the plurality of nodes is to be grouped together.

8. The method of claim 6, wherein applying the GCN machine learning model comprises:
identifying respective section classifications for the different sections of the document based on characteristics of the respective nodes for the different sections and the corresponding, respective edges connected to the respective nodes; and
determining the hierarchy for the document based on the respective section classifications.

9. The method of claim 6, wherein individual ones of the plurality of nodes comprise:
- respective image data obtained from the document for the portion of the text;
- a respective bounding box for the portion of the text; and
- a respective one or more text tokens for the portion of the text generated by the OCR technique.

10. The method of claim 6, wherein generating the graph representation comprises:
- for individual nodes of the plurality of nodes:
  - determining respective edges to connect to one or more other nodes of the plurality of nodes according to a connectivity policy selected from a plurality of connectivity policy options.

11. The method of claim 6, further comprising:
- applying an optical character recognition (OCR) technique to identify the text and the different sections in the document in response to receiving the document from a client; and
- generating respective bounding boxes for respective portions of the text.

12. The method of claim 6, further comprising:
- determining a reading order of the document based at least in part on the hierarchy of the different sections; and
- providing information indicating the reading order of the document.

13. The method of claim 6, further comprising:
- applying an object detection model to the text in the document to identify the different sections in the document based on the image of the document.

14. One or more non-transitory computer-readable storage media storing instructions that, when executed on or across one or more processors, cause the one or more processors to:
- in response to receiving a document comprising text, generate a graph representation of the document, wherein the graph representation comprises a plurality of nodes and a plurality of edges that connect different ones of the plurality of nodes, wherein individual ones of the nodes correspond to different portions of the text identified according to a text detection technique;
- apply a graph cluster network (GCN) machine learning model to the graph representation to identify a hierarchy of different sections of the document according to respective merge inferences generated by the GCN for individual ones of the plurality of edges; and
- provide the hierarchy of different sections of the document.

15. The one or more non-transitory computer-readable storage media of claim 14, wherein to apply the GCN machine learning model, the one or more computer-readable storage media further comprise instructions that, when executed on or across the one or more processors, cause the one or more processors to:
- identify individual ones of the different sections based on a determination that a respective subset of the plurality of nodes is to be grouped together.

16. The one or more non-transitory computer-readable storage media of claim 14, wherein to apply the GCN machine learning model, the one or more computer-readable storage media further comprise instructions that, when executed on or across the one or more processors, cause the one or more processors to:
- identify respective section classifications for the different sections of the document based on characteristics of the respective nodes for the different sections and the corresponding, respective edges connected to the respective nodes; and
- determine the hierarchy for the document based on the respective section classifications.

17. The one or more non-transitory computer-readable storage media of claim 14, wherein individual ones of the plurality of nodes comprise:
- respective image data cropped from the document for the portion of the text;
- a respective bounding box for the portion of the text; and
- a respective one or more text tokens for the portion of the text generated by the OCR technique.

18. The one or more non-transitory computer-readable storage media of claim 14, wherein to generate the graph representation, the one or more computer-readable storage media further comprise instructions that, when executed on or across the one or more processors, cause the one or more processors to:
- for individual nodes of the plurality of nodes:
  - determine respective edges to connect to one or more other nodes of the plurality of nodes according to a connectivity policy selected from a plurality of connectivity policies.

19. The one or more non-transitory computer-readable storage media of claim 14, further comprising instructions that, when executed on or across the one or more processors, cause the one or more processors to:
- apply an optical character recognition (OCR) technique to identify the text and the different sections in the document in response to receiving the document from a client; and
- generate respective bounding boxes for respective portions of the text.

20. The one or more non-transitory computer-readable storage media of claim 14, further comprising instructions that, when executed on or across the one or more processors, cause the one or more processors to:
- determine a reading order of the document based at least in part on the hierarchy of the different sections; and
- provide information indicating the reading order of the document.

* * * * *